(12) United States Patent
Yan et al.

(10) Patent No.: US 11,203,658 B2
(45) Date of Patent: Dec. 21, 2021

(54) COUPLED POLYMER PRODUCTS, METHODS OF MAKING AND COMPOSITIONS CONTAINING

(71) Applicant: Bridgestone Corporation, Chuo-ku (JP)

(72) Inventors: Yuan-Yong Yan, Copley, OH (US); Rita E. Cook, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 280 days.

(21) Appl. No.: 16/491,455

(22) PCT Filed: Mar. 8, 2018

(86) PCT No.: PCT/US2018/021483
§ 371 (c)(1),
(2) Date: Sep. 5, 2019

(87) PCT Pub. No.: WO2018/165387
PCT Pub. Date: Sep. 13, 2018

(65) Prior Publication Data
US 2020/0031979 A1  Jan. 30, 2020

Related U.S. Application Data

(60) Provisional application No. 62/468,644, filed on Mar. 8, 2017.

(51) Int. Cl.
*C08C 19/24* (2006.01)
*C08F 297/04* (2006.01)
(Continued)

(52) U.S. Cl.
CPC ........ *C08F 297/044* (2013.01); *B60C 1/0016* (2013.01); *C08C 19/25* (2013.01);
(Continued)

(58) Field of Classification Search
None
See application file for complete search history.

(56) References Cited

U.S. PATENT DOCUMENTS

4,523,618 A   6/1985  Yamamoto et al.
5,652,310 A   7/1997  Hsu et al.
(Continued)

FOREIGN PATENT DOCUMENTS

CN   1671779 A   9/2005
CN   1703475 B   1/2011
(Continued)

OTHER PUBLICATIONS

Extended European Search Report and Search Opinion from application EP 18764846.4, dated Nov. 24, 2020.
(Continued)

*Primary Examiner* — Peter A Salamon
(74) *Attorney, Agent, or Firm* — Meredith E. Hooker; Jenny L. Sheaffer

(57) ABSTRACT

Disclosed herein is a coupled polymer product comprising polymer with up to four polymer chains bonded to a functionalizing compound of formula II, wherein the polymer chains are comprised of conjugated diene-containing monomers optionally in combination with vinyl aromatic monomers and further include vinyl group-functionalized silane compound of formula I bonded within the polymer chain. Also disclosed are processes for producing the coupled polymer product as well as a rubber composition containing the coupled polymer product and tire components comprising the rubber composition.

20 Claims, 3 Drawing Sheets

GPC of Polymer of Example 1

(51) Int. Cl.
*B60C 1/00* (2006.01)
*C08C 19/25* (2006.01)
*C08L 9/06* (2006.01)

(52) U.S. Cl.
CPC ............ *C08L 9/06* (2013.01); *C08L 2201/08* (2013.01); *C08L 2205/025* (2013.01)

(56) References Cited

U.S. PATENT DOCUMENTS

| | | | |
|---|---|---|---|
| 6,759,497 | B2 | 7/2004 | Grun et al. |
| 7,202,306 | B2 | 4/2007 | Tanaka et al. |
| 7,288,594 | B2 | 10/2007 | Ozawa et al. |
| 7,534,839 | B2 | 5/2009 | Lawson et al. |
| 7,767,774 | B2 | 8/2010 | Suzuki et al. |
| 8,318,858 | B2 | 11/2012 | Oshima |
| 8,426,513 | B2 | 4/2013 | Jinbo et al. |
| 8,877,832 | B2 | 11/2014 | Ito et al. |
| 8,895,684 | B2 | 11/2014 | Thiele et al. |
| 8,933,165 | B2 | 1/2015 | Fujii |
| 9,279,045 | B2 | 3/2016 | Hoshino et al. |
| 9,284,438 | B2 | 3/2016 | Sato |
| 9,428,641 | B2 | 8/2016 | Sato et al. |
| 2003/0010423 | A1 | 6/2003 | Nakakado et al. |
| 2003/0152790 | A1 | 8/2003 | Halladay et al. |
| 2004/0018312 | A1 | 1/2004 | Halladay |
| 2004/0048082 | A1 | 3/2004 | Halladay et al. |
| 2004/0068036 | A1 | 4/2004 | Halladay et al. |
| 2005/0153138 | A1 | 7/2005 | Halladay |
| 2006/0025506 | A1 | 2/2006 | Weller et al. |
| 2007/0160797 | A1 | 7/2007 | Halladay |
| 2008/0033110 | A1 | 2/2008 | Suzuki et al. |
| 2010/0056710 | A1 | 3/2010 | Oshima |
| 2010/0137520 | A1 | 6/2010 | Robertson et al. |
| 2011/0171867 | A1 | 7/2011 | Li et al. |
| 2011/0319519 | A1 | 12/2011 | Sone et al. |
| 2013/0274408 | A1 | 10/2013 | Yan |
| 2013/0310512 | A1 | 11/2013 | Imoto et al. |
| 2013/0338296 | A1 | 12/2013 | Mabuchi et al. |
| 2013/0345337 | A1 | 12/2013 | Tsumori et al. |
| 2014/0011910 | A1 | 1/2014 | Mabuchi et al. |
| 2014/0011939 | A1 | 1/2014 | Iizuka et al. |
| 2014/0329931 | A1 | 11/2014 | Sato |
| 2014/0371383 | A1 | 12/2014 | Hayata et al. |
| 2016/0152756 | A1* | 6/2016 | Lawson ................ C08C 19/25 526/178 |
| 2016/0257827 | A1* | 9/2016 | Takiguchi ............... B32B 27/18 |
| 2017/0137541 | A1 | 5/2017 | Anezaki et al. |
| 2017/0174901 | A1 | 6/2017 | Okumura et al. |
| 2018/0223007 | A1 | 8/2018 | Yukimura |
| 2018/0346693 | A1 | 12/2018 | Dorato et al. |
| 2020/0031979 | A1* | 1/2020 | Yan .......................... C08L 9/00 |

FOREIGN PATENT DOCUMENTS

| | | |
|---|---|---|
| EP | 2787032 A1 | 10/2014 |
| JP | 2013-249418 A | 12/2013 |
| WO | 2004020475 A1 | 3/2004 |
| WO | 2016010100 A1 | 1/2016 |
| WO | 2017001637 A1 | 1/2017 |
| WO | 2017004395 A1 | 1/2017 |
| WO | 2017-019878 A1 | 2/2017 |
| WO | 2015152038 A1 | 4/2017 |

OTHER PUBLICATIONS

International Preliminary Report on Patentability from PCT/US2018/021483, dated Sep. 10, 2019.
International Search Report from PCT/US2018/021483, dated Jun. 27, 2018.

* cited by examiner

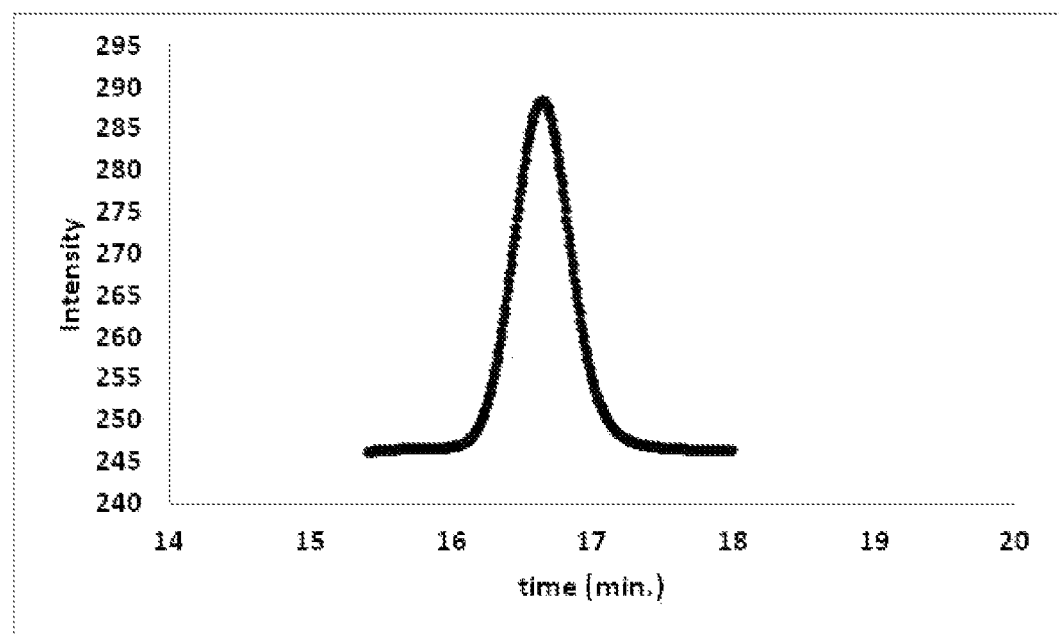
Figure 1: GPC of Polymer of Example 1

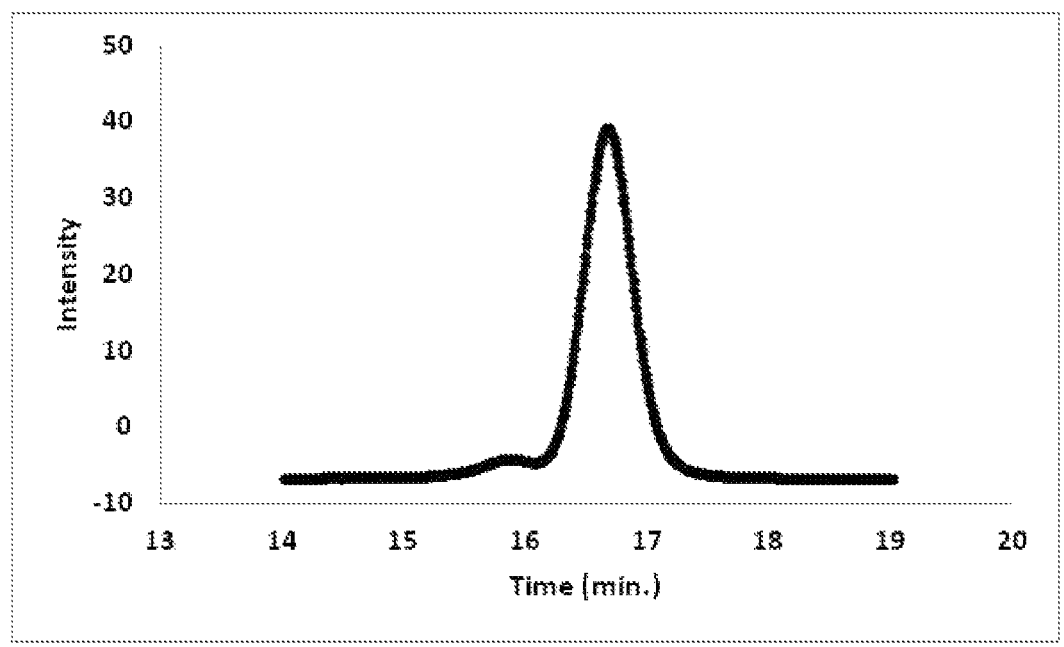
Figure 2: GPC of Polymer of Example 2

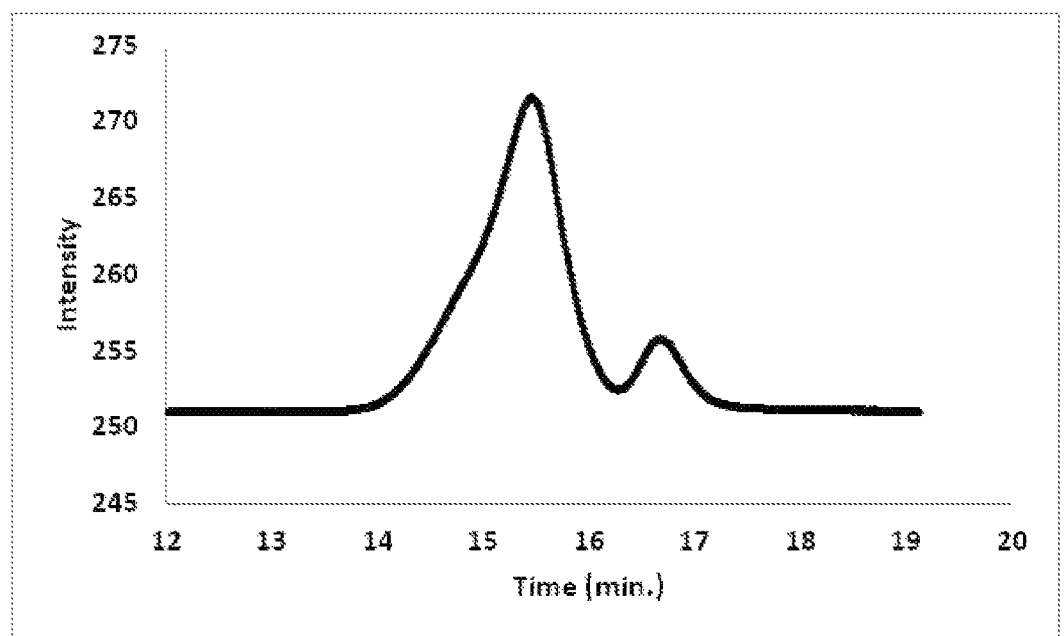
Figure 3: GPC of Polymer of Example 3

US 11,203,658 B2

COUPLED POLYMER PRODUCTS, METHODS OF MAKING AND COMPOSITIONS CONTAINING

This application is a national stage application of PCT/US2018/021483 filed Mar. 8, 2018, which claims the benefit of U.S. Provisional Application Ser. No. 62/468,644 filed Mar. 8, 2017, which are incorporated herein by reference.

FIELD

The present disclosure relates to functionalized polymers containing functionality/coupling rendering them into what may be described as "star" polymers, to methods of making the polymers, and to rubber compositions containing the polymers. The present disclosure also relates to tires having at least one component (e.g., a tread) containing the star polymer or a rubber composition thereof.

BACKGROUND

Rubber compositions for vehicles tires may utilize use rubber compositions containing functionalized and/or coupled polymers.

SUMMARY

Disclosed herein are a coupled polymer product comprising star polymers, methods of making the polymer product, and rubber compositions containing the polymer product. Also disclosed herein are tires having at least one component (e.g., a tread) containing the polymer product or a rubber composition thereof.

In a first embodiment, a process for preparing a coupled polymer product is disclosed. The process comprises: (a) polymerizing at least one conjugated diene monomer and optionally at least one vinyl aromatic monomer using an anionic initiator to produce polymer chains with a living end; (b) reacting the living end polymer chains from (a) with a vinyl group-functionalized aminosilane compound having formula I: $(H_2C=CH)-(A)_a-Si(R^1)(R^2)(R^3)$, wherein a is an integer of 0 or 1, A is divalent and selected from $C_6-C_{20}$ aromatic hydrocarbons optionally substituted with alkylene to which the Si is bonded, each of $R^1$, $R^2$, and $R^3$ are independently selected from linear or branched $C_1-C_{12}$ hydrocarbyl and $-N(R^4)(R^5)$, with at least one of $R^1$, $R^2$ and $R^3$ selected from $-N(R^4)(R^5)$, wherein each $R^4$ and $R^5$ are independently selected from aliphatic hydrocarbyl of $C_1-C_{12}$ or aromatic hydrocarbyl of $C_6-C_{18}$, with $R^4$ and $R^5$ optionally bonded together into a ring, and $R^1$ and $R^2$ are optionally bonded together into a ring comprising two nitrogen atoms, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains of the first intermediary product from (b), thereby producing a second intermediary product including polymer chains containing at least one vinyl group-functionalized aminosilane compound of formula I bonded within the polymer chain via its vinyl group, wherein the average number of vinyl group-functionalized aminosilane compound of formula I per polymer chain is about 0.1:1 to about 3:1; and (d) reacting the second intermediary product from (c) with a functionalizing compound having formula II: $N\equiv C-(Q)-Si(X^1)(X^2)(X^3)$, wherein Q is divalent and selected from $C_1-C_{12}$ aliphatic divalent hydrocarbon and $C_6-C_{18}$ aromatic hydrocarbon, each X is independently selected from halogens and optionally one X is selected from $C_1-C_{12}$ aliphatic hydrocarbyl and $C_6-C_{18}$ aromatic hydrocarbon, thereby producing a coupled polymer product comprising polymers with up to four polymer chains bonded to each functionalizing compound of formula II, wherein about 60 to about 95% by weight of the coupled polymer product comprises coupled polymer with two to four polymer chains bonded to each functionalizing compound of formula II.

In a second embodiment, a coupled polymer product is disclosed. The coupled polymer product comprises: polymer with up to four polymer chains bonded to a functionalizing compound of formula II: $N\equiv C-(Q)-Si(X^1)(X^2)(X^3)$, wherein Q is divalent and selected from $C_1-C_{12}$ aliphatic divalent hydrocarbon and $C_6-C_{18}$ aromatic hydrocarbon, each X is independently selected from halogens and optionally one X is selected from $C_1-C_{12}$ aliphatic hydrocarbyl and $C_6-C_{18}$ aromatic hydrocarbon, the polymer chains comprising (a) at least one conjugated diene-containing monomer optionally in combination with at least one vinyl aromatic monomer, and (b) at least one vinyl group-functionalized silane compound of formula I bonded within the polymer chain via its vinyl group wherein formula I is as follows: $(H_2C=CH)-(A)_a-Si(R^1)(R^2)(R^3)$, wherein a is an integer of 0 or 1, A is divalent and selected from $C_6-C_{20}$ aromatic hydrocarbons optionally substituted with alkylene to which the Si is bonded, each of $R^1$, $R^2$, and $R^3$ are independently selected from linear or branched $C_1-C_{12}$ hydrocarbyl and $-N(R^4)(R^5)$, with at least one of $R^1$, $R^2$ and $R^3$ selected from $-N(R^4)(R^5)$, wherein each $R^4$ and $R^5$ are independently selected from aliphatic hydrocarbyl of $C_1-C_{12}$ or aromatic hydrocarbyl of $C_6-C_{18}$, with $R^4$ and $R^5$ optionally bonded together into a ring, and with $R^1$ and $R^2$ optionally bonded together into a ring comprising two nitrogen atoms, wherein the average number of vinyl group-functionalized aminosilane compound of formula I per polymer chain is about 0.1:1 to about 3:1, and about 60 to about 95% by weight of the coupled polymer product has 2 to 4 polymer chains bonded to the functionalizing compound of formula II.

In a third embodiment, a rubber composition comprising the coupled polymer product of the second embodiment or the coupled polymer product resulting from the process of the first embodiment is disclosed. The rubber composition comprises:

BRIEF DESCRIPTION OF THE DRAWINGS

FIG. 1 is a graph showing a GPC plot of a sample of the coupled polymer product of Example 1 diluted in THF solution. The plot was prepared using Tosoh Bioscience GPC equipped with styrene divinyl benzene columns and using THF as a mobile phase. The single peak represents uncoupled polymer.

FIG. 2 is a graph showing a GPC plot of a sample of the coupled polymer product of Example 2 diluted in THF solution. The plot was prepared using Tosoh Bioscience GPC equipped with styrene divinyl benzene columns and using THF as a mobile phase. The single peak represents uncoupled polymer.

FIG. 3 is a graph showing a GPC plot of a sample of the coupled polymer product of Example 3 diluted in THF solution. The plot was prepared using Tosoh Bioscience GPC equipped with styrene divinyl benzene columns and using THF as a mobile phase. The smaller peak represents a combination of un-functionalized and mono-functionalized polymers and the larger peak represents a combination of polymers with 2, 3 or 4 polymer chains bonded to each functionalized compound of formula II.

The graphs of FIGS. 1-3 were prepared by plotting time on the X axis and on the Y axis a scale proportional to intensity.

DETAILED DESCRIPTION

Disclosed herein are a coupled polymer product comprising star polymers, methods of making the polymer product, and rubber compositions containing the polymer product. Also disclosed herein are tires having at least one component (e.g., a tread) containing the polymer product or a rubber composition thereof.

In a first embodiment, a process for preparing a coupled polymer product is disclosed. The process comprises: (a) polymerizing at least one conjugated diene monomer and optionally at least one vinyl aromatic monomer using an anionic initiator to produce polymer chains with a living end; (b) reacting the living end polymer chains from (a) with a vinyl group-functionalized aminosilane compound having formula I: $(H_2C=CH)-(A)_a-Si(R^1)(R^2)(R^3)$, wherein a is an integer of 0 or 1, A is divalent and selected from $C_6-C_{20}$ aromatic hydrocarbons optionally substituted with alkylene to which the Si is bonded, each of $R^1$, $R^2$, and $R^3$ are independently selected from linear or branched $C_1-C_{12}$ hydrocarbyl and $—N(R^4)(R^5)$, with at least one of $R^1$, $R^2$ and $R^3$ selected from $—N(R^4)(R^5)$, wherein each $R^4$ and $R^5$ are independently selected from aliphatic hydrocarbyl of $C_1-C_{12}$ or aromatic hydrocarbyl of $C_6-C_{18}$, with $R^4$ and $R^5$ optionally bonded together into a ring, and $R^1$ and $R^2$ are optionally bonded together into a ring comprising two nitrogen atoms, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains of the first intermediary product from (b), thereby producing a second intermediary product including polymer chains containing at least one vinyl group-functionalized aminosilane compound of formula I bonded within the polymer chain via its vinyl group, wherein the average number of vinyl group-functionalized aminosilane compound of formula I per polymer chain is about 0.1:1 to about 3:1; and (d) reacting the second intermediary product from (c) with a functionalizing compound having formula II: $N≡C-(Q)-Si(X^1)(X^2)(X^3)$, wherein Q is divalent and selected from $C_1-C_{12}$ aliphatic divalent hydrocarbon and $C_6-C_{18}$ aromatic hydrocarbon, each X is independently selected from halogens and optionally one X is selected from $C_1-C_{12}$ aliphatic hydrocarbyl and $C_6-C_{18}$ aromatic hydrocarbon, thereby producing a coupled polymer product comprising polymers with up to four polymer chains bonded to each functionalizing compound of formula II, wherein about 60 to about 95% by weight of the coupled polymer product comprises coupled polymer with two to four polymer chains bonded to each functionalizing compound of formula II.

In a second embodiment, a coupled polymer product is disclosed. The coupled polymer product comprises: polymer with up to four polymer chains bonded to a functionalizing compound of formula II: $N≡C-(Q)-Si(X^1)(X^2)(X^3)$, wherein Q is divalent and selected from $C_1-C_{12}$ aliphatic divalent hydrocarbon and $C_6-C_{18}$ aromatic hydrocarbon, each X is independently selected from halogens and optionally one X is selected from $C_1-C_{12}$ aliphatic hydrocarbyl and $C_6-C_{18}$ aromatic hydrocarbon, the polymer chains comprising (a) at least one conjugated diene-containing monomer optionally in combination with at least one vinyl aromatic monomer, and (b) at least one vinyl group-functionalized silane compound of formula I bonded within the polymer chain via its vinyl group wherein formula I is as follows: $(H_2C=CH)-(A)_a-Si(R^1)(R^2)(R^3)$, wherein a is an integer of 0 or 1, A is divalent and selected from $C_6-C_{20}$ aromatic hydrocarbons optionally substituted with alkylene to which the Si is bonded, each of $R^1$, $R^2$, and $R^3$ are independently selected from linear or branched $C_1-C_{12}$ hydrocarbyl and $—N(R^4)(R^5)$, with at least one of $R^1$, $R^2$ and $R^3$ selected from $—N(R^4)(R^5)$, wherein each $R^4$ and $R^5$ are independently selected from aliphatic hydrocarbyl of $C_1-C_{12}$ or aromatic hydrocarbyl of $C_6-C_{18}$, with $R^4$ and $R^5$ optionally bonded together into a ring, and with $R^1$ and $R^2$ optionally bonded together into a ring comprising two nitrogen atoms, wherein the average number of vinyl group-functionalized aminosilane compound of formula I per polymer chain is about 0.1:1 to about 3:1, and about 60 to about 95% by weight of the coupled polymer product has 2 to 4 polymer chains bonded to the functionalizing compound of formula II.

In a third embodiment, a rubber composition comprising the coupled polymer product of the second embodiment or the coupled polymer product resulting from the process of the first embodiment is disclosed. The rubber composition comprises:

In a fourth embodiment, a tire component is provided comprising the rubber composition of the third embodiment.

Definitions

The terminology as set forth herein is for description of the embodiments only and should not be construed as limiting the invention as a whole.

As used herein, the term "alkylene" refers to a divalent aliphatic radical derived from an alkene by opening of the double bond or from an alkane by removal of two hydrogen atoms. Non-limiting examples include $—CH_2—$ (methylene) and $—CH_2—CH_2—$ (ethylene).

As used herein, the term "head" of a polymer is used to refer to the chain end where initiator residue resides, whereas the term "end" or "tail" is used to refer to the chain end nearest the location where the final monomer unit has been added to the polymer.

As used herein, the term hydrocarbyl refers to a univalent radical derived from a hydrocarbon.

As used herein, the abbreviation Mn is used for number average molecular weight.

As used herein, the abbreviation Mp is used for peak molecular weight.

As used herein, the abbreviation Mw is used for weight average molecular weight.

Unless otherwise indicated herein, the term "Mooney viscosity" refers to the compound Mooney viscosity, $ML_{1+4}$. As those of skill in the art will understand, a rubber composition's Mooney viscosity is measured prior to vulcanization or curing.

As used herein, the term "phr" means parts per one hundred parts rubber.

Coupled Polymer Product and Monomers

As discussed above, the second embodiment disclosed herein is directed to a coupled polymer product, the first embodiment is directed to a process of preparing a coupled polymer product, and the third embodiment is directed to a rubber composition containing the coupled polymer product of the second embodiment or the coupled polymer product made by the process of the first embodiment. By the phrase coupled polymer product is meant that the polymers within the coupled polymer product represent a mixture of polymers having differing numbers of polymer chains bonded to a functionalizing compound of formula II. The coupling of multiple polymer chains to a functionalizing compound of formula II results in multi-arm polymers which may be referred to as star polymers. Since more than one polymer chain can bond to the functionalizing compound, the bonding may be referred to as coupling and the polymer chains as "coupled" to the functionalizing compound of formula II. More specifically, according to the first-third embodiments, about 60 to about 95% by weight of the coupled polymer product comprises polymers with 2 to 4 polymer chains (i.e., 2 polymer chains, 3 polymer chains, or 4 polymer chains) bonded to the functionalizing compound of formula II. The remaining amount of the coupled polymer product (e.g., 10% by weight when the amount having 2 to 4 polymer chains bonded to the functionalizing compound of formula II is 90% by weight) represents polymers with either 0 or 1 polymer chain bonded to the functionalizing compound of formula II. A polymer having 0 polymer chains bonded to the functionalizing compound of formula II can be referred to as an un-functionalized polymer (although such a polymer may still contain vinyl group-functionalized aminosilane compound bonded within the polymer chain). A polymer having only 1 polymer chain bonded to the functionalizing compound of formula II can be referred to as a mono-functionalized polymer (such a polymer may also contain vinyl group-functionalized aminosilane compound bonded within the polymer chain). In certain embodiments of the first-third embodiments 60 to 95% by weight (e.g., 60%, 65%, 70%, 75%, 80%, 85%, 90%, or 95% by weight), 70 to 95% by weight, 75 to 95% by weight, 80 to 95% by weight, or 60 to 90% by weight of the coupled polymer product has 2 to 4 polymer chains bonded to the functionalizing compound of formula II. The amount (by weight) of coupled polymer product which comprises polymers having 2 to 4 polymer chains bonded to the functionalizing compound of formula II can be measured by GPC, whereby the portion of the product having 2 to 4 chains will be represented by a relatively large peak eluting after a relatively smaller peak (the smaller peak representing polymers with either 0 or 1 polymer chains bonded to the functionalizing compound of formula II).

As discussed above, the polymer chains which are present in the coupled polymer product of the first-third embodiments, are comprised of at least one conjugated diene-containing monomer optionally in combination with at least one vinyl aromatic monomer. Furthermore, the polymer chains also include at least one vinyl group-functionalized silane compound of formula I bonded within the polymer chain via its vinyl group. By stating that the vinyl group-functionalized silane compound of formula I is bonded within the polymer chain via its vinyl group meant that the compound becomes bonded within the polymer chain (i.e., via the vinyl group, as discussed below). According to the first-third embodiments, the vinyl group-functionalized silane compound of formula I is not positioned at the head of the polymer (since it is not added as a functionalized initiator), but instead appears more than 1 mer beyond the head of the polymer chain (e.g., $2^{nd}$ mer, $3^{rd}$ mer, . . . $100^{th}$ mer, . . . $1000^{th}$ mer, etc.). In certain embodiments of the first-third embodiments, the vinyl group-functionalized silane compound of formula I is positioned within the chain by at least 1% of the polymer mers from the head of the polymer chain (e.g., at least 1%, 1%, at least 5%, 5%, at least 10%, 10%, at least 20%, 20%, at least 30%, 30%, at least 40%, 40%, at least 50%, or 50%) and up to 99% of the polymer mers from the head (e.g., up to 51%, up to 55%, up to 60%, up to 70%, up to 80%, up to 90%, up to 95%, up to 99%). In other embodiments, the vinyl group-functionalized silane compound of formula I appears at the end of the polymer chain (i.e., as the last mer). As discussed further below, in certain preferred embodiments of the first-third embodiments, the vinyl group-functionalized silane compound of formula I is positioned within the polymer chain by at least 50% of the polymer mers from the head of the polymer chain and up to 95% of the polymer mers from the head. Such positioning can be achieved by allowing the polymerization of the monomers to progress for a period of time (e.g., to proceed at least partially towards completion) prior to adding the vinyl group-functionalized silane compound of formula I, and then allowing the polymerization of monomers to further proceed after the addition of the vinyl group-functionalized silane compound of formula I. According to the first-third embodiments, the average number of vinyl group-functionalized aminosilane compound of formula I per polymer chain is about 0.1:1 to about 3:1. As a non-limiting example, if the average number is 0.1:1 then for each 10 polymer chains one vinyl group-functionalized aminosilane compound of formula I would be present. In certain embodiments of the first-third embodiments, the average number of vinyl group-functionalized aminosilane compound of formula I per polymer chain is 0.1:1 to 3:1 (e.g., 0.1:1, 0.2:1, 0.3:1, 0.4:1, 0.5:1, 0.6:1, 0.7:1, 0.8:1, 0.9:1, 1:1, 1.2:1, 1.4:1, 1.5:1, 1.6:1, 1.8:1, 2:1, 2.2:1, 2.4:1, 2.5:1, 2.6:1, 2.8:1, 3:1), 0.3 to 2:1, or 0.3 to 1:1. By stating that the vinyl group-functionalized silane compound of formula I is bonded via its vinyl group is meant that the alpha and beta carbons of the vinyl group become incorporated into the polymer chain. The average number of vinyl group-functionalized silane compound of formula I per polymer chain can be measured by NMR (more specifically $H^1$-NMR of the —Si—CH$_3$).

As mentioned above, according to the first-third embodiments, the polymer chains of the coupled polymer product comprise at least one conjugated diene monomer and optionally at least one vinyl aromatic monomer. In certain embodiments of the first-third embodiments, the polymer chains of the coupled polymer product consist of at least one conjugated diene monomer (i.e., as the only type of monomer). In certain embodiments of the first-third embodiments, the polymer chains of the coupled polymer product comprise at least one conjugated diene monomer and at least one vinyl aromatic monomer (i.e., the at least one vinyl aromatic monomer is present). In certain embodiments of the first-third embodiments, the polymer chains of the coupled polymer product consist of at least one conjugated diene monomer and at least one vinyl aromatic monomer (i.e., as the only type of monomers). According to the first-third embodiments, one or more than one type of conjugated diene monomer may be utilized. Similarly, according to the first-third embodiments, when at least one vinyl aromatic monomer is present, one or more than one type of vinyl aromatic monomer may be utilized.

As those of skill in the art understand, a conjugated diene is a compound that has two double carbon-carbon bonds (i.e., two —C═C— bonds) that are separated by a single bond (i.e., —C—C—); a conjugated diene will contain at least one —C═C—C═C— moiety). The particular structure of the conjugated diene monomer used in or present in the polymer chains of the embodiments of the first-third embodiments disclosed herein can vary. Non-limiting examples of suitable conjugated diene monomers for use in the embodiments of the first-third embodiments disclosed herein include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and combinations thereof. In certain embodiments of the first-third embodiments disclosed herein, the conjugated diene monomer comprises or is 1,3-butadiene. In certain embodiments of the first-third embodiments disclosed herein, the conjugated diene monomer consists of 1,3-butadiene.

As mentioned above in certain embodiments of the first-third embodiments, the polymer chains (i.e., of the coupled polymer product) contain at least one vinyl aromatic monomer in addition to the at least one conjugated diene monomer. In those embodiments of the first-third embodiments disclosed herein wherein at least one type of vinyl aromatic monomer is present in the polymer chains, may comprise at least one of styrene, alpha-methyl styrene, p-methylstyrene, o-methylstyrene, p-butylstyrene, vinylnaphthalene, p-tert-butylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one type vinyl aromatic monomer comprises styrene. In certain embodiments of the first-third embodiments, the vinyl aromatic monomer consists of styrene (i.e., the only vinyl aromatic monomer utilized is styrene). In certain embodiments of the first-third embodiments wherein the polymer chains comprise at least one conjugated diene monomer in combination with at least one type of vinyl aromatic monomer, they are utilized at a weight ratio of 95:5 to 50:50 (e.g., 95-50% conjugated diene monomer and 5-50% vinyl aromatic monomer), including 95:5 to 65:35. In certain embodiments of the first-third embodiments wherein the polymer chains comprise (or alternatively consist of) a combination of 1,3-butadiene and styrene monomers, the styrene content of the polymer chains is about 10 to about 50% (e.g., 10%, 15%, 20%, 25%, 30%, 35%, 40%, 45%, 50%) of weight of the total monomer content (i.e., 1,3-butadiene+styrene), including 10-50% by weight, about 18 to about 40% by weight, and 18-40% by weight. In certain embodiments of the first-fourth embodiments wherein the polymer chains comprise (or alternatively consist of) a combination of 1,3-butadiene and styrene, the polymer chains have a microstructure with about 8 to about 99% by mass vinyl bonds (1,2-vinyl) in the butadiene portion, including 8-99% (e.g., 8%, 10%, 15%, 20%, 25%, 30%, 35%, 40%, 45%, 50%, 55%, 60%, 65%, 70%, 80%, 85%, 90%, 95%, 99%), about 10 to about 60% and 10-60% by weight. The vinyl bond content in the butadiene portion of a polymer chain or the resulting terminal-functionalized polymer can be determined by $H^1$-NMR and $C^{13}$-NMR (e.g., using a 300 MHz Gemini 300 NMR Spectrometer System (Varian).

According to the first-third embodiments disclosed herein, the molecular weight (Mw) of the coupled polymer product may vary. In certain embodiments of the first-third embodiments disclosed herein, the coupled polymer product has a Mw of 80,000 to 1,000,000 grams/mole (e.g., 100,000; 200,000; 250,000; 300,000; 350,000; 400,000; 450,000; 500,000; 600,000; 700,000; 800,000, 900,000; or 1,000,000 grams/mole). In certain embodiments of the first-third embodiments disclosed herein, the coupled polymer product has a Mw of 200,000 to 800,000, including 300,000 to 700,000 grams/mole. The Mw values referred to herein are weight average molecular weights which can be determined by using gel permeation chromatography (GPC) calibrated with polystyrene standards and Mark-Houwink constants for the polymer in question.

According to the first-third embodiments disclosed herein, the molecular weight (Mw) of the polymer chains (arms) in the coupled polymer product may vary. In certain embodiments of the first-third embodiments disclosed herein, the polymer chains have a Mw of 80,000 to 400,000 grams/mole (e.g., 80,000; 100,000; 150,000; 200,000; 250,000; 300,000; 350,000; or 400,000 grams/mole).

According to the first-third embodiments disclosed herein, the number average molecular weight (Mn) of the coupled polymer product may vary. In certain embodiments of the first-third embodiments disclosed herein, the coupled polymer product has a Mn of 80,000 to 1,000,000 grams/mole (e.g., 100,000; 200,000; 250,000; 300,000; 350,000; 400,000; 450,000; 500,000; 600,000; 700,000; 800,000, 900,000; or 1,000,000 grams/mole), preferably 100,000 to 700,000 grams/mole or 100,000 to 600,000 grams/mole. The Mn values referred to herein are number average molecular weights which can be determined by using gel permeation chromatography (GPC) calibrated with polystyrene standards and Mark-Houwink constants for the polymer in question.

According to the first-third embodiments disclosed herein, the number average molecular weight (Mn) of the polymer chains in the coupled polymer product may vary. In certain embodiments of the first-third embodiments disclosed herein, the polymer chains have a Mn of 80,000 to 200,000 grams/mole (e.g., 80,000; 100,000; 120,000; 140,000; 160,000; 180,000; or 200,000 grams/mole).

According to the first-third embodiments disclosed herein, the polydispersity (Mw/Mn) of the coupled polymer product may vary. In certain embodiments of the first-third embodiments disclosed herein, the coupled polymer product has a Mw/Mn of 1 to 3.5 (e.g., 1, 1.1, 1.2, 1.3, 1.4, 1.5, 1.6, 1.7, 1.8, 1.9, 2, 2.5, 3, 3.5), preferably 1 to 2.

According to the first-third embodiments disclosed herein, the glass transition temperature (Tg) of the coupled polymer product may vary. In certain embodiments of the first-third embodiments disclosed herein, the coupled polymer product has a Tg of −20° C. to −70° C. (e.g., −20, −25, −30, −35, −40, −45, −50, −55, −60, −65, or −70° C.). In certain embodiments of the first-third embodiments disclosed herein, the coupled polymer product has a Tg of −20° C. to −60° C., including −25° C. to −50° C. The Tg values referred to herein can be determined by DSC (Differential Scanning Calorimetry), as described in the working examples herein.

Vinyl Group-Functionalized Aminosilane Compound

As discussed above, the coupled polymer product of the second embodiment disclosed herein comprises polymer chains which comprise (include) at least one vinyl group-functionalized silane compound of formula I bonded within the polymer chain via its vinyl group. Similarly, the process of the first embodiment disclosed herein includes reacting living end polymer chains with a vinyl group-functionalizing compound of formula I to produce polymer chains containing at least one vinyl group-functionalized aminosilane compound of formula I bonded within the polymer chain via its vinyl group. Formula I is as follows:

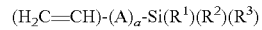

and according to formula I, a is an integer of 0 or 1, A is divalent and selected from $C_6$-$C_{20}$ aromatic hydrocarbons optionally substituted with alkylene to which the Si is bonded, each of $R^1$, $R^2$, and $R^3$ are independently selected from linear or branched $C_1$-$C_{12}$ hydrocarbyl and —N($R^4$)($R^5$), with at least one of $R^1$, $R^2$ and $R^3$ selected from —N($R^4$)($R^5$), wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and with $R^1$ and $R^2$ optionally bonded together into a ring comprising two nitrogen atoms. The ($H_2C$=CH) group represents the vinyl group. As should be clear from an examination of formula II, when A is present, it is bonded to both the alpha carbon of the vinyl group and to silicon (Si).

In certain embodiments of the first-third embodiments, a in formula I is an integer of 0. In other words, in such embodiment, no A is present in these compounds. In other embodiments of the first-third embodiments, a in formula I is an integer 1. In other words, in such embodiment, A is present in these compounds. In those embodiments of the first-third embodiments wherein a is 1 and A is present, A is divalent and is selected from $C_6$-$C_{20}$ aromatic hydrocarbons optionally substituted with aliphatic hydrocarbyl. By substituted with aliphatic hydrocarbyl is meant that the aromatic ring within A may contain a substituent which acts as a spacer between the aromatic ring of A and the Si of formula I. Preferably, the aliphatic aromatic substituent is $C_1$ to $C_{12}$ (e.g., $C_1$, $C_2$, $C_3$, $C_4$, $C_5$, $C_6$, $C_7$, $C_8$, $C_9$, $C_{10}$, $C_{11}$, $C_{12}$). In certain embodiments of the first-third embodiments, A represents —$C_6H_4$ (i.e., a divalent radical derived by removing two hydrogen from a benzene ring). In certain such embodiments, only one of $R^1$, $R^2$ and $R^3$ comprise $NR^4R^5$ (the N may optionally be present in a ring structure which includes multiple —($CH_2$)—) such as pyrrolidine, and in other embodiments two or all (i.e., three) of $R^1$, $R^2$ and $R^3$ comprises $NR^4R^5$ (optionally, two N may be joined together in a ring structure which includes the Si and multiple —($CH_2$)—); in such embodiments, any remaining of $R^1$, $R^2$ and $R^3$ which are not selected from $NR^4R^5$ are as discussed above, but are preferably methyl or ethyl. The foregoing types of compounds of formula I can be described generally as amino-silyl-styrene compounds. Exemplary amino-silyl-styrene compounds include, but are not limited to 4-[(N,N-diethylamino)-dimethylsilyl]styrene, 4-[(N,N-dimethylamino)-dimethylsilyl]styrene, 4-[pyrrolidyl-dimethylsilyl]styrene, 4-[bis(dimethylamino)methylsilyl]styrene, 4-[N,N'-dimethyl-ethylene-diaminomethylsilyl]styrene, and N,N'-dimethyl-1,2-cyclohexanediaminomethylsilylstyrene.

As mentioned above, each of $R^1$, $R^2$, and $R^3$ are independently selected from linear or branched $C_1$-$C_{12}$ hydrocarbyl and —N($R^4$)($R^5$), with at least one of $R^1$, $R^2$ and $R^3$ selected from —N($R^4$)($R^5$), wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring (thereby forming a nitrogen-containing ring), and with $R^1$ and $R^2$ optionally bonded together into a saturated ring comprising two nitrogen atoms. Non-limiting examples of moieties formed when $R^1$ and $R^2$ are bonded together into a ring comprising two nitrogen atoms include cyclic azasilanes. In certain embodiments of the first-third embodiments, only one of $R^1$, $R^2$ and $R^3$ is selected from —N($R^4$)($R^5$). In other embodiments of the first and second embodiments, two of $R^1$, $R^2$ and $R^3$ are selected from —N($R^4$)($R^5$). In other embodiments of the first-third embodiments, each (i.e., all three) of $R^1$, $R^2$ and $R^3$ is selected from —N($R^4$)($R^5$). In certain embodiments of the first-third embodiments, two or three of $R^1$, $R^2$, and $R^3$ (e.g., $R^1$ and $R^2$) are selected from —N($R^4$)($R^5$) and two of the N thereof are bonded together into a ring comprising two N atoms along with the Si also in the ring. In certain embodiments of the first-third embodiments, one, two or all of $R^1$, $R^2$, and $R^3$ are selected from —N($R^4$)($R^5$), but none of the N thereof are in ring structures.

In those embodiments of the first-third embodiments, wherein one or two of $R^1$, $R^2$ and $R^3$ is/are selected from linear or branched $C_1$-$C_{12}$ (e.g., $C_1$, $C_2$, $C_3$, $C_4$, $C_5$, $C_6$, $C_7$, $C_8$, $C_9$, $C_{10}$, $C_{11}$, $C_{12}$) hydrocarbyl, the particular hydrocarbyl group may vary. When two hydrocarbyl groups are present they may be the same or different. In certain embodiments of the first-third embodiments, the hydrocarbyl of at least one of (i.e., one, two or all three of) $R^1$, $R^2$, or $R^3$ is linear or branched aliphatic $C_1$-$C_6$, $C_1$-$C_3$, or $C_1$-$C_2$ (e.g., methyl or ethyl). In other embodiments of the first-third embodiments, the hydrocarbyl of at least one of $R^1$, $R^2$, or $R^3$ is aromatic $C_6$-$C_{12}$ ($C_6$, $C_7$, $C_8$, $C_9$, $C_{10}$, $C_{11}$, $C_{12}$).

Functionalizing Compound

As discussed above, the coupled polymer product of the second embodiment as well as the coupled polymer product used in the rubber composition of the third embodiment comprises up to four polymer chains bonded to a functionalizing compound of formula II. Similarly, the process of the first embodiment disclosed herein includes reacting polymer chains with a functionalizing compound of formula II to produce a polymer product comprising up to four polymer chains bonded to a functionalizing compound of formula II. Formula II is as follows:

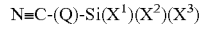

$$N\equiv C\text{-}(Q)\text{-}Si(X^1)(X^2)(X^3)$$

and according to formula II, Q is divalent and selected from $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$) aliphatic divalent hydrocarbon and $C_6$-$C_{18}$ aromatic hydrocarbon, each X is independently selected from halogens and optionally one X is selected from $C_1$-$C_{12}$ (i.e., $C_1$, $C_2$, $C_3$ $C_4$, $C_5$, $C_6$, $C_7$, $C_8$, $C_9$, $C_{10}$, $C_{11}$, or $C_{12}$) aliphatic hydrocarbyl and $C_6$-$C_{18}$ aromatic hydrocarbon. In those embodiments of the first-third embodiments wherein one X is selected from aliphatic hydrocarbyl and aromatic hydrocarbon, as discussed above, X is preferably methyl or ethyl. As should be apparent from an examination of formula II, none of $X^1$, $X^2$ or $X^3$ are alkoxy.

In certain embodiments of the first-third embodiments, each X (i.e., each of $X^1$, $X^2$ and $X^3$) is independently selected from halogens. The halogen for each X may be the same or different, but is preferably the same. Preferably the halogen is chlorine or bromine, most preferably chlorine. Exemplary compounds wherein each X is chlorine include 3-cyanobutyl-trichlorosilane, 3-cyanopropyl-trichlorosilane, 1-cyanoethyl-trichlorosilane, and 2-cyanoethyl-trichlorosilane.

In other embodiments of the first-third embodiments, one of X is selected from $C_1$-$C_{12}$ aliphatic hydrocarbyl and $C_6$-$C_{18}$ aromatic hydrocarbon. In certain such embodiments, X is selected from $C_1$-$C_{12}$ aliphatic hydrocarbyl. In certain embodiments, wherein one X is selected from $C_1$-$C_{12}$ aliphatic divalent hydrocarbon, the aliphatic divalent hydrocarbon is saturated. In certain embodiments of the first-third embodiments wherein X is selected from $C_1$-$C_{12}$ aliphatic divalent hydrocarbon, the aliphatic divalent hydrocarbon is $C_1$-$C_6$, $C_1$-$C_4$, or most preferably $C_1$-$C_2$ (i.e., methyl or ethyl).

As mentioned above, Q of formula II is divalent and is selected from $C_1$-$C_{12}$ aliphatic divalent hydrocarbon and $C_6$-$C_{18}$ aromatic hydrocarbon. By divalent is meant that Q is bonded to both the carbon of the cyano group and to the silicon in formula II. In certain embodiments of the first-third embodiments, Q is selected from $C_1$-$C_{12}$ aliphatic divalent hydrocarbon. In certain embodiments, wherein Q is selected from $C_1$-$C_{12}$ aliphatic divalent hydrocarbon, the aliphatic divalent hydrocarbon is saturated. In certain embodiments of the first-third embodiments wherein Q is selected from $C_1$-$C_{12}$ aliphatic divalent hydrocarbon, Q is branched (i.e., the cyano is not attached to the last C in the chain of the hydrocarbon). In certain embodiments of the first and second embodiments wherein Q is selected from $C_1$-$C_{12}$ aliphatic divalent hydrocarbon, the aliphatic divalent hydrocarbon is $C_1$-$C_6$, or $C_2$-$C_4$.

As those of skill in the art will understand, formula II as represented above represents the functionalizing compound before bonding to the polymer chains occurs. Functionalizing compounds having formula II are capable of bonding with up to four polymer chains. More specifically, such bonding may occur by replacement of any $X^1$, $X^2$, or $X^3$ with a polymer chain as well as at the cyano end of formula II (for up to a total of four polymer chains bonded to the functionalizing compound of formula II). Accordingly, once the functionalizing compound of formula II has bonded to one or more polymer chains, the structure of formula II can more precisely be described as a "residue" of the functionalizing compound of formula II wherein at least one (and up to all) of $X^1$, $X^2$, $X^3$ and the cyano group (i.e., N≡C) have been replaced by a polymer chain.

Processes for Preparing the Coupled Polymer Product

As mentioned above, the first embodiment disclosed herein, is directed to a process for preparing a coupled polymer product. The process of the first embodiment can be understood as comprising steps (a)-(d) as follows: (a) polymerizing at least one conjugated diene monomer and optionally at least one vinyl aromatic monomer using an anionic initiator to produce polymer chains with a living end; (b) reacting the living end polymer chains of the first intermediary product from (a) with a vinyl group-functionalized aminosilane having formula I, thereby producing a first intermediary product including polymer chains containing at least one vinyl group-functionalized aminosilane compound bonded to the polymer chain via its vinyl group; (c) continuing polymerization of the at least one conjugated diene monomer and at least one vinyl aromatic monomer when present from (a) upon the polymer chains of the first intermediary product from (b), thereby producing a second intermediary product including polymer chains containing at least one vinyl group-functionalized aminosilane compound of formula I bonded within the polymer chain via its vinyl group, wherein the average number of vinyl group-functionalized aminosilane compound of formula I per polymer chain is about 0.1:1 to about 3:1; and (d) reacting the second intermediary product from (c) with a functionalizing compound having formula II, thereby producing a coupled polymer product comprising polymers with up to four polymer chains bonded to each functionalizing compound of formula II, wherein about 60 to about 95% by weight of the coupled polymer product comprises coupled polymer with two to four polymer chains bonded to each functionalizing compound of formula II. Since the coupled polymer product of step (d) is formed from the second intermediary product from step (c) which second intermediary product includes polymer chains containing at least one vinyl group-functionalized aminosilane compound of formula I bonded within the polymer chain via its vinyl group, wherein the average number of vinyl group-functionalized aminosilane compound of formula I per polymer chain is about 0.1:1 to about 3:1, the polymer chains present in the coupled polymer product of step (d) should also be understood to contain the vinyl group-functionalized aminosilane compound of formula I in the same amount.

According to the process of the first embodiment, the amount of time for step (a) to continue prior to step (b) beginning may vary. Preferably, the vinyl group-functionalized aminosilane compound of formula I is not present when the polymerization of step (a) begins. In other words, according to the process of the first embodiment, polymerization of the monomers in step (a) preferably begins in the absence of any vinyl group-functionalized aminosilane compound of formula I. In certain embodiments of the first embodiment, the polymerization of (a) is allowed to proceed to 1 to 99% (e.g., 1%, 10%, 20%, 30%, 40%, 50%, 55%, 60%, 65%, 70%, 75%, 80%, 85%, 90%, 95%, 99%) of completion prior to step (b), i.e., prior to adding a vinyl group-functionalizing aminosilane compound of formula I to the polymer chains with a living end from (a). In preferred embodiments of the first embodiment, the polymerization of (a) is allowed to proceed to 50 to 95% of completion prior to step (b), i.e., prior to adding a vinyl group-functionalizing aminosilane compound of formula I to the polymer chains with a living end from (a). The completeness of the polymerization can be determined by various methods which generally entail measurement of reaction kinetics, such as by utilizing equipment designed to monitor factors such as the polymerization temperature and conversion percentages. In certain embodiments of the first embodiment, the polymerization of (a) is allowed to proceed to a peak temperature prior to step (b), i.e., prior to adding a vinyl group-functionalizing aminosilane compound of formula I to the polymer chains with a living end from (a). In certain embodiments of the first embodiment, the polymerization of (a) is allowed to proceed to a peak temperature and thereafter for a time period of about 1 to about 10 minutes or 1-10 minutes (e.g., 1, 2, 3, 4, 5, 6, 7, 8, 9, or 10 minutes), preferably about 1 to about 5 minutes or 1-5 minutes prior to step (b), i.e., prior to adding a vinyl group-functionalizing aminosilane compound of formula I to the polymer chains with a living end from (a). In other words, a vinyl group-functionalizing aminosilane compound of formula I is added to the polymer chains with a living end from (a) about 1-10 minutes, 1-10 minutes, about 1 to about 5 minutes, or 1-5 minutes after the polymerization of (a) reaches a peak temperature. In other embodiments of the first embodiment, the vinyl group-functionalizing aminosilane compound of formula I is added to the polymer chains with a living end from (a) before the polymerization of (a) has reached peak temperature; in other words, in such embodiments, a peak temperature is not allowed to occur in (a) before (b) occurs. Allowing the polymerization of (a) to occur for a period of time or to a conversion % (each as discussed above), allows for the vinyl group-functionalizing compound of formula I to be bonded within the polymer chain rather than at the end or at the head of the polymer. Thus, allowing the polymerization of (a) to occur for a period of time or to a conversion % as discussed above, allows for the vinyl group-containing compound of formula I to be positioned within the chain by at least 1% of the polymer mers from the head of the polymer chain and up to 99% of the polymer mers from the head, or within the chain by at least 50% of the polymer mers from the head of the polymer chain and up to 90% of the polymer mers from the head, as discussed above.

As mentioned above, step (b) of the process of the first embodiment corresponds to reacting the living end polymer chains from step (a) with a vinyl group-functionalized aminosilane compound having formula I, thereby producing a first intermediary product including polymer chains containing at least one vinyl group-functionalized aminosilane compound bonded to the polymer chain via its vinyl group.

In step (b), a reaction takes place between the vinyl group-functionalized aminosilane compound of formula I and the living end of a polymer chain. More specifically, the vinyl group-functionalized aminosilane compound becomes bonded to the polymer chain via the vinyl group of the aminosilane compound. Generally, the polymer chain can be described as having the vinyl group-functionalized aminosilane compound of formula II bonded to the end of the polymer chain.

As mentioned above, the vinyl group-functionalized aminosilane compound has a structure corresponding to formula I, as follows:

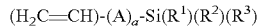

and according to formula I, a is an integer of 0 or 1, A is divalent and selected from $C_6$-$C_{20}$ aromatic hydrocarbons optionally substituted with aliphatic hydrocarbyl to which the Si is bonded, each of $R^1$, $R^2$, and $R^3$ are independently selected from linear or branched $C_1$-$C_{12}$ hydrocarbyl and —$N(R^4)(R^5)$, with at least one of $R^1$, $R^2$ and $R^3$ selected from —$N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and with $R^1$ and $R^2$ optionally bonded together into a ring comprising two nitrogen atoms.

According to the process of the first embodiment, one or more than one vinyl group-functionalized aminosilane compound of formula I may be utilized in step (b). In certain embodiments of the first embodiment, only one vinyl group-functionalized aminosilane of formula I is utilized in step (b). The vinyl group-functionalized aminosilane of formula I is discussed in more detail above and that discussion should be understood to apply fully to embodiments of the first embodiment.

According to the process of the first embodiment, the amount of vinyl group-functionalized aminosilane compound of formula I which is utilized in step (b) may vary. In certain embodiments of the second embodiment, the molar ratio of the vinyl group-functionalized aminosilane of formula I to anionic initiator (i.e., from step (a)) is 0.1:1 to 3:1. (e.g., 0.1:1, 0.2:1, 0.3:1, 0.4:1, 0.5:1, 0.6:1, 0.7:1, 0.8:1, 0.9:1, 1:1, 1.2:1, 1.4:1, 1.5:1, 1.6:1, 1.8:1, 2:1, 2.2:1, 2.4:1, 2.5:1, 2.6:1, 2.8:1 or 3:1). In certain embodiments of the first embodiment, the molar ratio of the vinyl group-functionalized aminosilane of formula I to anionic initiator (i.e., from step (a)) is 0.3:1 to 1:1.

As mentioned above, step (c) of the process of the first embodiment corresponds to continuing polymerization of the at least one conjugated diene monomer and at least one vinyl aromatic monomer when present from (a) upon the polymer chains of the first intermediary product from (b), thereby producing a second intermediary product including polymer chains containing at least one vinyl group-functionalized aminosilane compound of formula I bonded within the polymer chain via its vinyl group. In other words, the monomer(s) from step (a) which have not yet polymerized continue polymerization by adding to the end of the polymer chains of the first intermediary product from (b) creating additional mers from the monomer(s). By stating that the second intermediary product includes polymer chains containing at least one vinyl group-functionalized aminosilane compound of formula I bonded within the polymer chain is meant that one or more than one type of vinyl group-functionalized aminosilane compound of formula I may have been used in step (b). Generally, the number of mers in the polymer chain which result from the reaction of the vinyl group-functionalized aminosilane compound of formula I is limited to 1 to about 3 mers and in certain embodiments is 1-3 mers, 1-2 mers, 1 mer, no more than 3 mers, no more than 2 mers, or no more than 1 mer. The overall number of vinyl group-functionalized aminosilane compound of formula I which is present within the polymer chain may be measured as an average number of the occurrences of formula I per polymer chain and may vary as discussed in more detail above.

According to the process of the first embodiment, the amount of time for which polymerization of the monomers is continued in step (c) before step (d) occurs (i.e., before addition of a functionalizing compound of formula II to react with the second intermediary product from (c)) may vary. In certain embodiments of the first embodiment, the polymerization in (c) is allowed to continue for about 10 minutes to about 1 hour, 10 minutes to 1 hour (e.g., 10 minutes, 15 minutes, 20 minutes, 30 minutes, 40 minutes, 50 minutes, or 1 hour), about 20 minutes to about 1 hour, 20 minutes to 1 hour, about 30 minutes to about 50 minutes, or 30 minutes to 50 minutes before step (d) occurs, i.e., prior to adding a functionalizing compound of formula II to the second intermediary product from step (c). In other embodiments of the first embodiment, the polymerization in (c) is allowed to continue until the monomers have fully polymerized before addition of a functionalized compound of formula II.

As discussed above, according to the first embodiment, step (d) corresponds to reacting a functionalizing compound of formula II with the second intermediary product from step (c), i.e., the polymer chains containing at least one vinyl group-functionalized aminosilane compound of formula I bonded within the polymer chain via its vinyl group, thereby producing a coupled polymer product comprising polymers with up to four polymer chains bonded to each functionalizing compound of formula II. More specifically, the functionalizing compound of formula II reacts by bonding to the end of the polymer chains from of the second intermediary product from (c). The functionalizing compound of formula II is capable of bonding with up to four polymer chains by replacement of any (or all) of $X^1$, $X^2$, or $X^3$ with a polymer chain as well as by addition of one polymer chain at the cyano end of formula II. As mentioned above, once the functionalizing compound of formula II has bonded to one or more polymer chains, the structure of formula II can more precisely be described as a "residue" of the functionalizing compound of formula II.

As mentioned above, the functionalizing compound used in step (d) has a structure corresponding to formula II, as follows:

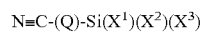

and according to formula II, Q is divalent and selected from $C_1$-$C_{12}$ aliphatic divalent hydrocarbon and $C_6$-$C_{18}$ aromatic hydrocarbon, each X is independently selected from halogens and optionally one X is selected from $C_1$-$C_{12}$ aliphatic hydrocarbyl and $C_6$-$C_{18}$ aromatic hydrocarbon. As should be apparent from an examination of formula II, none of $X^1$, $X^2$ or $X^3$ are alkoxy.

According to the process of the first embodiment, one or more than one functionalizing compound of formula II may be utilized in step (d). In certain embodiments of the first embodiment, only one functionalizing compound of formula II is utilized in step (d). The functionalizing compound of formula II is discussed in more detail above and that discussion should be understood to apply fully to embodiments of the first embodiment.

According to the process of the first embodiment, the amount of functionalizing compound of formula II which is utilized in step (d) may vary. In certain embodiments of the first embodiment, the molar ratio of the functionalizing compound of formula II to anionic initiator (i.e., from step (a)) is 0.05:1 to 1:1. (e.g., 0.05:1, 0.1:1, 0.2:1, 0.3:1, 0.4:1, 0.5:1, 0.6:1, 0.7:1, 0.8:1, 0.9:1, or 1:1). In certain embodiments of the first embodiment, the molar ratio of the functionalizing compound of formula II to anionic initiator (i.e., from step (a)) is 0.2:1 to 0.9:1.

According to the process of the first embodiment, step (d) results in a coupled polymer product comprising polymers with up to four polymer chains bonded to each functionalizing compound of formula II. As discussed in more detail above, about 60 to about 95% by weight of the coupled polymer product comprises coupled polymer with two to four polymer chains bonded to each functionalizing compound of formula II, with the remainder of the coupled polymer product comprising a combination of un-functionalized polymer and mono-functionalized polymer. The amount of coupled polymer product corresponding to polymers with two to four polymer chains bonded to each functionalizing compound of formula II as compared to the amount of un-functionalized and mono-functionalized polymer may vary in certain embodiments of the first embodiment within the foregoing ranges as discussed in more detail above.

Anionic Polymerization

As mentioned above, the process of the first embodiment includes polymerizing monomers using an anionic initiator to produce polymer chains with a living end. Anionic polymerization of conjugated diene monomers generally involves the use of an anionic initiator in combination with the monomer(s) and an optional solvent, the general process of which (i.e., other than the use of the functionalizing compound disclosed herein) is well known to those having skill in the art. Generally, the monomer or monomers are polymerized according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, and emulsion polymerization; in solution polymerization, the concentration of the monomer(s) in the solution is preferably within a range of 5 to 50% by mass, more preferably 10 to 30% by mass. The polymerization system is not particularly limited and may be a batch system or a continuous system. In certain embodiments of the first embodiment disclosed herein, an anionic polymerization is conducted utilizing an anionic initiator, generally an organic alkaline metal compound, preferably a lithium-containing compound. Examples of lithium-containing compounds useful as anionic initiators include, but are not limited to, hydrocarbyl lithium compounds, lithium amide compounds, and similar sodium compounds. In certain embodiments of the first embodiment disclosed herein, the amount of the lithium compound used as the anionic initiator is preferably within a range of 0.2 to 20 millimoles per 100 g of the monomer. In certain embodiments of the first embodiment, a functionalized initiator is utilized. Non-limiting examples of functionalized initiators include organic alkaline metal compounds (e.g., an organolithium compound) that additionally include one or more heteroatoms (e.g., nitrogen, oxygen, boron, silicon, sulfur, tin, and phosphorus atoms) or heterocyclic groups containing the foregoing, frequently one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578, 542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference. In certain preferable embodiments when a functional initiator is utilized, the functional group added by the initiator is different from the functional group added by the functionalizing compounds disclosed herein. In certain embodiments of the first embodiment, a functional nitrogen-containing initiator is utilized; non-limiting examples include cyclic amines, particularly cyclic secondary amines such as azetidine; pyrrolidine; piperidine; morpholine; N-alkyl piperazine; hexamethyleneimine; heptamethyleneimine; and dodecamethyleneimine.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. Generally, the anionic polymerization is conducted using monomers in a hydrocarbon solvent inactive to the polymerization reaction, examples of which include hydrocarbon solvents such as aromatic hydrocarbon, aliphatic hydrocarbon, or cycloaliphatic hydrocarbon. Non-limiting examples of hydrocarbon solvents inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof.

In certain embodiments of the first embodiment, the anionic polymerization process is carried out in the presence of a randomizer. The randomizer can control the microstructure of the resulting polymer, and has an action such that the 1,2-bond content in the butadiene unit (or butadiene portion) of the polymer using, for example, 1,3-butadiene as a monomer is controlled, and butadiene units and styrene units in the copolymer using 1,3-butadiene and styrene as a monomer are randomized, or the like. Non-limiting examples of the randomizer include dimethoxybenzene, tetrahydrofuran, linear and cyclic oligomeric oxolanyl alkanes such as 2,2-bis(2'-tetrahydrofuryl)propane, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mole of the organic alkaline metal compound as a polymerization initiator.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Rubber Compositions

As discussed above, the third embodiment disclosed herein is directed to a rubber composition comprising the coupled polymer product of the second embodiment or the coupled polymer product resulting from the process of the first embodiment. The rubber composition comprises: (a) 10-100 parts of the coupled polymer product of the first embodiment or the coupled polymer product resulting from the process of the first embodiment, (b) 0-90 parts of at least one diene monomer-containing polymer; and (c) 5-200 phr of at least one reinforcing filler selected from carbon black, silica, and combinations thereof. In certain embodiments of the third embodiment, the rubber composition further comprises a cure package, as discussed in more detail below. In certain embodiments of the third embodiment, the rubber composition further comprises a cure package as well as at least one of the other ingredients discussed below (oils, waxes, processing aids, antioxidants, tackifying resins, reinforcing resins, and peptizers).

In certain embodiments of the third embodiment, the amount of component (a), i.e., the coupled polymer product, may vary within 10-100 parts such as being present in amounts of 20-100 parts, 30-100 parts, 40-100 parts, 50-100 parts, 10-90 parts, 10-80 parts, 10-70 parts, 10-60 parts, 10 parts, 20 parts, 30 parts, 40 parts, 50 parts, 60 parts, 70 parts, 80 parts, 90 parts, or 100 parts, etc. One or more than one coupled polymer product may be utilized as component (a).

According to the third embodiment, the amount of component (b), i.e., the amount of at least one diene monomer-containing polymer, present in the rubber composition may vary so as to allow for 100 total parts of polymer (rubber) in combination with component (a). Thus, according to the third embodiment, the amount of component (b) may be 0-90 parts (e.g., 0 parts, 10 parts, 20 parts, 30 parts, 40 parts, 50 parts, 60 parts, 70 parts, 80 parts, or 90 part), 10-90 parts, 10-80 parts, 10-70 parts, 10-60 parts, 20-90 parts, 20-80 parts, etc.

The 5 to 200 phr of reinforcing filler should be understood to refer to the total amount of reinforcing filler when more than one reinforcing filler is utilized. In other words, such rubber compositions may comprise carbon black filler, silica filler, or a combination of carbon black and silica filler in the foregoing specified amounts. Moreover, it should be understood that one or more than one of each may be utilized as reinforcing filler in the foregoing specified total amounts, i.e., one carbon black, more than one carbon black, one carbon black and one silica, one carbon black and more than one silica filler, more than one carbon black and one silica, or more than one carbon black and more than one silica filler. In certain embodiments of the second and third embodiments, the rubber composition comprises 10 to 200 phr, 20 to 200 phr, 30 to 200 phr, 40 to 200 phr, 50 to 200 phr, 10 to 180 phr, 20 to 180 phr, 30 to 180 phr, 40 to 180 phr, 10 to 150 phr, 20 to 150 phr, 30 to 150 phr, 40 to 150 phr, 10 to 120 phr, 20 to 120 phr, 30 to 120 phr, 40 to 120 phr, 10 to 100 phr, 20 to 100 phr, 30 to 100 phr, 40 to 100 phr, 10 phr, 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, or 200 phr of at least one reinforcing filler selected from carbon black, silica, and combinations thereof. In certain embodiments of the third embodiment, the rubber composition comprises at least one additional reinforcing filler other than carbon black or silica, examples of which are discussed below.

Reinforcing Filler

As used herein, the term "reinforcing" with respect to "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the third embodiment disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the third embodiment disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

Silica

As discussed above, in certain embodiments of the third embodiment disclosed herein the at least one reinforcing filler comprises silica. One or more than one reinforcing silica filler may be utilized. Suitable reinforcing silica fillers for use in certain embodiments of the third embodiment are well known. Non-limiting examples of reinforcing silica fillers suitable for use in certain embodiments of the third embodiment include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the third embodiment include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the third embodiment disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 m²/g to about 220 m²/g (including 150 m²/g to 220 m²/g) being included. In certain embodiments of the third embodiment disclosed herein, the rubber composition comprises reinforcing silica filler having a pH of about 5.5 to about 7 or slightly over 7, preferably about 5.5 to about 6.8. Some of the commercially available reinforcing silica fillers which can be used in certain embodiments of the third embodiment include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165MP), and J. M. Huber Corporation.

In certain embodiments of the third embodiment disclosed herein, when the at least one reinforcing filler includes silica filler, one or more than one silica coupling agents may also (optionally) be utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the third embodiment disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treacted silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^{10}{}_p Si(OR^{11})_{4-p}$ where each $R^{11}$ is independently a monovalent organic group, and p is an integer from 1 to 3, with the proviso that at least one $R^{10}$ is an alkyl group. Preferably p is 1. Generally, each $R^{10}$ independently comprises $C_1$ to $C_{20}$ aliphatic, $C_5$ to $C_{20}$ cycloaliphatic, or $C_6$ to $C_{20}$ aromatic; and each $R^{11}$ independently comprises $C_1$ to $C_6$ aliphatic. In certain exemplary embodiments, each $R^{10}$ independently comprises $C_6$ to $C_{15}$ aliphatic and in additional embodiments each $R^{10}$ independently comprises $C_8$ to $C_{14}$ aliphatic. Mercapto silanes have the general formula $HS-R^{13}-Si(R^{14})(R^{15})_2$ where $R^{13}$ is a divalent organic group, $R^{14}$ is a halogen atom or an alkoxy group, each $R^{15}$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B-S-R^{16}-Si-X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^{16}$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the third embodiment include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyltributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyltrimethoxysilane, methyloctyl dimethoxysilane, and mixtures thereof.

Non-limiting examples of bis(trialkoxysilylorgano)polysulfides suitable for use in certain embodiments of the third embodiment include bis(trialkoxysilylorgano) disulfides and bis(trialkoxysilylorgano)tetrasulfides. Specific non-limiting examples of bis(trialkoxysilylorgano)disulfides include, but are not limited to, 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in certain embodiments of the third embodiment include, but are not limited to, bis(3-triethoxysilylpropyl)tetrasulfide, bis(2-triethoxysilylethyl) tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of third embodiment disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the third embodiment disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate;

methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., about 5 to about 200 phr, etc.).

When a silica coupling agent is utilized in an embodiment of the third embodiment, the amount used may vary. In certain embodiments of the third embodiment, the rubber compositions do not contain any silica coupling agent. In other embodiments of the third embodiment, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the third embodiment, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Carbon Black

As discussed above, in certain embodiments of the third embodiment the at least one reinforcing filler which comprises carbon black. One or more than one carbon black reinforcing filler can be utilized. As discussed in more detail below, most carbon blacks are commonly understood to be reinforcing fillers. In certain embodiments of the third embodiment, the rubber composition comprises carbon black in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the third embodiment, the carbon black comprises no more than about 30% by weight (including no more than 30% by weight) of the total reinforcing filler in the rubber composition. In certain embodiments of the third embodiment, the rubber composition comprises about 5 to about 100 phr (including 5 to 100 phr) of one or more carbon blacks.

Generally, suitable carbon blacks for use as a reinforcing filler in the rubber composition of certain embodiments of the third embodiment include any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethylammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the third embodiment, the rubber composition includes a mixture of two or more of the foregoing blacks. Typical suitable carbon blacks for use in certain embodiments of the third embodiment are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Reinforcing Fillers

As discussed above, in certain embodiments of the third embodiment, the at least one reinforcing filler comprises a reinforcing filler other than carbon black or silica (i.e., an additional reinforcing filler). One or more than one additional reinforcing filler may be utilized. In certain embodiments of the third embodiment, the rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the rubber composition of certain embodiments of the third embodiment are well known. Non-limiting examples of suitable additional reinforcing fillers for use in the rubber compositions of certain embodiments of the third embodiment include, but are not limited to, alumina, aluminum hydroxide, clay (reinforcing grades), magnesium hydroxide, boron nitride, aluminum nitride, titanium dioxide, reinforcing zinc oxide, and combinations thereof.

Non-Reinforcing Fillers

In certain embodiments of the third embodiment, the rubber composition further comprises at least one of the following non-reinforcing fillers: clay (non-reinforcing grades), graphite, magnesium dioxide, aluminum oxide, starch, boron nitride (non-reinforcing grades), silicon nitride, aluminum nitride (non-reinforcing grades), calcium silicate, and silicon carbide. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments, the term "non-reinforcing filler" is alternatively or additionally used to refer to a particulate material that has a particle size of greater than about 1000 nm (including less than 1000 nm).

Cure Package

In certain embodiments of the third embodiment disclosed herein, the rubber composition includes (further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the third embodiment, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the third embodiment, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the third embodiment disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

Other ingredients that may be employed in certain embodiments (i.e., are optional) of the third embodiment are known to those of skill in the art and include oils (processing and extender), waxes, processing aids, antioxidants, tackifying resins, reinforcing resins, peptizers, and the components of a cure package.

In certain embodiments of the third embodiment, the rubber composition comprises about 5 to about 60 phr (e.g., 5, 10, 15, 20, 25, 30, 35, 40, 45, 50, 55, or 60 phr), 5 to 60 phr, 5 to 20 phr, about 25 to about 60 phr, 25 to 60 phr, or 30 to 50 phr of at least one resin; in certain such embodiments the at least one resin is a plasticizing resin. As used herein, the term plasticizing resin refers to a compound that is solid at room temperature (23° C.) and is miscible in the rubber composition at the amount used which is usually at least 5 phr. Generally, the plasticizing resin will act as a diluting agent and can be contrasted with tackifying resins which are generally immiscible and may migrate to the surface of a rubber composition providing tack. In certain embodiments of the third embodiment, wherein a plasticizing resin is utilized, it comprises a hydrocarbon resin and may be aliphatic type, aromatic type or aliphatic/aromatic type depending on the monomers contained therein. Examples of suitable plasticizing resins for use in the rubber compositions of the third embodiment include, but are not limited to, cyclopentadiene (abbreviated to CPD) or dicyclopentadiene (abbreviated to DCPD) homopolymer or copolymer resins, terpene homopolymer or copolymer resins and C5 fraction homopolymer or copolymer resins. Such resins may be used, for example, individually or in combination. In certain embodiments of the third embodiment, a plasticizing resin is used which meets at least one of the following: a Tg greater than 30° C. (preferably greater than 40° C. and/or no more than 120° C. or no more than 100° C.), a number average molecular weight (Mn) of between 400 and 2000 grams/mole (preferably 500-2000 grams/mole), and a polydispersity index (PI) of less than 3 (preferably less than 2), wherein PI=Mw/Mn and Mw is the weight-average molecular weight of the resin. Tg of the resin can be measured by DSC (Differential Scanning Calorimetry) according to ASTM D3418 (1999). Mw, Mn and PI of the resin may be determined by size exclusion chromatography (SEC), using THF, 35° C.; concentration 1 g/l; flow rate 1 milliliters/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

In certain embodiments of the third embodiment, the rubber composition comprises tackifying resin in an amount of 1 to 15 phr, 1 to 10 phr, or 1 to 5 phr. Exemplary tackifying resins include but are not limited to: rosin and its derivatives, hydrocarbon resins, and phenol-formaldehyde resins. One or more than one type as well as one or more than one of tackifying resin may be utilized in certain embodiments of the third embodiments. The tackifying resin will generally be solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols.

Various antioxidants are known to those of skill in the art and may be utilized in the rubber compositions of certain embodiments of the third embodiment; these include but are not limited to certain waxes, phenolic antioxidants, amine phenol antioxidants, hydroquinone antioxidants, alkyl-diamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the third embodiment. In certain embodiments of the third embodiment, the total amount of antioxidant(s) used is 1 to 5 phr.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can be used as an extender oil, i.e., to prepare an oil-extended polymer or copolymer or as a processing or free oil. Generally, for most uses of the rubber compositions in tire components the total amount of oil used (processing oil and any extender oil) in the rubber compositions disclosed herein ranges from about 1 to about 70 phr, including 1 to 70 phr (e.g., 1, 5, 10, 15, 20, 25, 30, 35, 40, 45, 50, 55, 60, 65, or 70 phr), about 2 to about 60 phr, 2 to 60 phr, about 3 to about 50 phr, and 3 to 50 phr. However, in certain applications, the total amount of oil used (processing oil and any extender oil) in the rubber compositions and methods disclosed herein is much higher and ranges up to about 175 phr (e.g., 50, 60, 70, 80, 90, 100, 110, 120, 130, 140, 150, 160, 170 or 175 phr), including up to 175 phr, up to about 150 phr, up to 150 phr, up to about 100 phr, and up to 100 phr.

Preparing the Rubber Compositions

The particular steps involved in preparing rubber compositions according to the third embodiment disclosed herein are generally those of conventionally practiced methods comprising mixing the ingredients in at least one non-productive master-batch stage and a final productive mixing stage. In certain embodiments of the third embodiment, the rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the third embodiment, the rubber composition is prepared by a process comprising more than one non-productive master-batch mixing stage.

Generally, the rubbers (or polymers) and at least one reinforcing filler (as well as any silane coupling agent and oil) will be added in a non-productive or master-batch mixing stage or stages. Generally, at least the vulcanizing agent component and the vulcanizing accelerator component of a cure package will be added in a final or productive mixing stage.

In certain embodiments of the third embodiment, the rubber composition is prepared using at least one non-productive master batch mixing stage conducted at a temperature of about 130° C. to about 200° C. In certain embodiments of the third embodiment, the rubber composition is prepared using a final productive mixing stage conducted at a temperature below the vulcanization temperature in order to avoid unwanted pre-cure of the rubber composition. Therefore, the temperature of the productive or final mixing stage generally should not exceed about 120° C. and is typically about 40° C. to about 120° C., or about 60° C. to about 110° C. and, especially, about 75° C. to about 100° C. In certain embodiments of the third embodiment, the rubber composition is prepared according to a method that includes at least one non-productive mixing stage and at least one productive mixing stage. Where a rubber composition of the third embodiment includes fillers other than (or in addition to) carbon black, a separate re-mill stage may optionally be employed for separate addition of a portion or all of the other fillers. This stage often is performed at temperatures similar to, although often slightly lower than, those employed in the masterbatch stage, i.e., ramping from about 90° C. to a drop temperature of about 150° C.

Tires and Tire Treads

As discussed above, the fourth embodiment disclosed herein is directed to a tire component comprising the rubber composition of the third embodiment. As mentioned above, the rubber compositions of the third embodiment utilize the coupled polymer product of the second embodiment or the coupled polymer product resulting from the process of the first embodiment. Thus, the fourth embodiment disclosed herein should be understood to include coupled polymer product which varies according to the description provided herein for the first-third embodiments, as if those variations were fully repeated in this section. In certain embodiments of the fourth embodiment, the tire component comprises a tire tread.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that functionalizing compounds (i.e., compounds according to formula II) other than and in differing amounts than utilized in the Examples can be utilized, that vinyl group-functionalized aminosilane compounds (i.e., compounds according to formula I) other than and in differing amounts than utilized in the Examples can be utilized, that the particular coupled polymer product used in the Examples can be utilized in different amounts and/or with rubbers, fillers, and other ingredients which differ in amount, composition, or both from those used in the examples (i.e., as fully disclosed in the preceding paragraphs); and that a coupled polymer product which differs in type, amount or both can be utilized with the rubbers, fillers, and other ingredients used in the examples as well as rubbers, fillers, and other ingredients which different in amount, composition, or both from those used in the examples (i.e., as fully disclosed in the preceding paragraphs).

Example 1

To a two gallon $N_2$ purged reactor equipped with a stirrer was added 1.506 kilograms of hexane, 0.412 kilograms of styrene (33.0 weight % in hexane), and 2.567 kilograms of 1,3-butadiene (21.2 weight % in hexane). The reactor was charged with 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 30 minutes, the batch temperature peaked at 66.7° C. After an additional 40 minutes, the polymer cement was dropped into isopropanol containing butylated hydroxytoluene (BHT) and drum dried. The resulting polymer has properties as shown below in Table 1. Example 1 can be considered a control since the polymer product lacks any vinyl group-functionalized amino silane compound of formula I and also lacks any functionalizing compound of formula II.

Examples 2 and 3

To a two gallon $N_2$ purged reactor equipped with a stirrer was added 1.506 kilograms of hexane, 0.412 kilograms of styrene (33.0 weight weight % in hexane), and 2.567 kilograms of 1,3-butadiene (21.2 weight % in hexane). The reactor was with charged 3.55 milliliters of n-butyl-lithium (1.6 Molar in hexane) in 20 milliliters of hexane, followed by 1.45 milliliters of 2,2-bis(2'-tetrahydrofuryl)propane (1.6 Molar in hexane) in 20 milliliters of hexane, and the reactor jacket was heated to 50° C. After 29 minutes, the batch temperature peaked at 66.7° C. 0.66 milliliters of "neat" bis(dimethylamino)-vinylmethylsilane (5.17 Molar) diluted in 20 milliliters of hexane was added right after the peak temperature (conversion percentage was about 80% at time of addition). After an additional 40 minutes, half of the polymer cement was dropped into a dried 28 ounce glass bottle and terminated with isopropanol containing butylated hydroxytoluene (BHT) and drum dried, resulting in the polymer of Example 2. To the remaining living cement, 0.13 milliliters of "neat" (3-cyanobutyl)trichlorosilane (5.63 Molar) diluted in 20 milliliters of hexane was added. After an additional 30 minutes, the polymer cement was dropped into isopropanol containing butylated hydroxytoluene (BHT) and drum dried, resulting in the polymer of Example 3. The resulting polymers have properties as shown below in Table 1. Example 2 can be considered a control since even though the polymer product contains vinyl group-functionalized amino silane compound of formula I, it lacks any functionalizing compound of formula II. Example 3 can be considered an inventive example according to the present disclosure.

TABLE 1

| | Mn (grams/mole) | Mw (grams/mole) | Mp (grams/mole) | Mw/Mn | % coupling | Tg (° C.) |
|---|---|---|---|---|---|---|
| 1 | 102615 | 106834 | 105753 | 1.041 | 0.0 | −36.72 |
| 2 | 114786 | 123197 | 114986 | 1.073 | 5.27 | −34.65 |
| 3 | 279630 | 419150 | 335822 | 1.499 | 85.83 | −34.22 |

Examples 1-A, 2-A, 3-A, 1-B, 2-B and 3-B

Rubber compositions were prepared using 100 parts of one of the SBR copolymers prepared according to Examples 1, 2, and 3, with the first set of rubber compositions containing carbon black as reinforcing filler and the second set containing silica as reinforcing filler. The formulation for each set of rubber compositions is shown in Table 2, where the amounts of ingredients are listed in phr. The mixing procedure for preparing the composition is shown below in Tables 3A and 3B with Table 3A directed to the carbon black-containing Examples (1-A, 2-A and 3-A) and Table 3B directed to the silica-containing Examples (1-B, 2-B and 3-B). Examples 1-A, 2-A, 1-B and 2-B are controls since they do not contain coupled polymer product according to the present disclosure.

TABLE 2

| | 1-A | 2-A | 3-A | 1-B | 2-B | 3-B |
|---|---|---|---|---|---|---|
| Master Batch | | | | | | |
| SBR | 100 | 100 | 100 | 100 | 100 | 100 |
| SBR of Example . . . | 1 | 2 | 3 | 1 | 2 | 3 |
| Silica | 0 | 0 | 0 | 80 | 80 | 80 |
| Carbon black[1] | 50 | 50 | 50 | 0 | 0 | 0 |
| Wax | 2 | 2 | 2 | 2 | 2 | 2 |
| Oil | 10 | 10 | 10 | 10 | 10 | 10 |
| Stearic acid | 2 | 2 | 2 | 2 | 2 | 2 |
| 6PPD[2] | 0.95 | 0.95 | 0.95 | 0.95 | 0.95 | 0.95 |
| Re-mill | N/A | N/A | N/A | | | |
| Final | | | | | | |
| Sulfur | 1.5 | 1.5 | 1.5 | 1.5 | 1.5 | 1.5 |
| Accelerators | 1.3 | 1.3 | 1.3 | 3.8 | 3.8 | 3.8 |
| Zinc oxide | 2.5 | 2.5 | 2.5 | 2.5 | 2.5 | 2.5 |

[1]N343 grade
[2]N-(1,3-dimethylbutyl)-N'-phenyl-phenylenediamine

TABLE 3A

Mixing Parameters (Carbon Black Compositions)

| Stage | Time | Condition |
|---|---|---|
| Master Batch Stage (initial temp: 130-135° C., rotor rpm started at 60) | 0 seconds<br>30 seconds | Charge polymers<br>Charge oil, carbon black filler and other master-batch ingredients, increase rotor speed to 90 rpm<br>Drop based on max temperature of 165° C. or 5.5 minutes mixing (whichever comes first) |
| Final Batch Stage (initial temp: 65-70° C., rotor rpm at 45) | 0 seconds<br>0 seconds | Charge Master Batch<br>Charge curatives<br>Drop based on max temperature of 100° C. or 2.5 minutes mixing (whichever comes first) |

TABLE 3B

Mixing Parameters (Silica Compositions)

| Stage | Time | Condition |
|---|---|---|
| Master Batch Stage (initial temp: 135° C., rotor rpm started at 70) | 0 seconds<br>30 seconds | Charge polymers<br>Charge oil, silica filler and other master-batch ingredients, increase rotor speed to 70 rpm<br>Drop based on max temperature of 165° C. or 5 minutes mixing (whichever comes first) |
| Remill Stage (initial temp: 135° C., rotor rpm at 70) | 0 seconds | Charge Master Batch<br>Drop based on max temperature of 150° C. or 1.5 minutes mixing (whichever comes first) |
| Final Batch Stage (initial temp: 85° C., rotor rpm at 50) | 0 seconds<br>0 seconds | Charge Remill<br>Charge curatives<br>Drop based on max temperature of 110° C. or 1.8 minutes mixing (whichever comes first) |

Certain properties of the rubber compositions were measured and are reported below in Table 4. Indexed values were calculated by dividing the value for a rubber composition according to the present disclosure (i.e., Examples 3-A and 3-B) by control 1-A or 1-B, respectively. The index value for Examples 2-A and 2-B also represents the respective value divided by the measured value for Example 1-A or 1-B, respectively.

Tan δ values were measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature of 50° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded. A rubber composition's tan δ at 50° C. is indicative of its rolling resistance when incorporated into a tire tread.

The Mooney viscosities disclosed herein for the rubber compositions were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor started. The Mooney viscosity was recorded for each sample as the torque at four minutes after the rotor started. Generally, a lower Mooney viscosity is beneficial. Therefore a lower index value for Mooney viscosity can be considered advantageous. The Mooney viscosities disclosed herein for polymers were determined at 100° C., using a procedure that was otherwise as described above.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100\,(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

The % coupling and Tg were measured as described above (i.e., by GPC and DSC, respectively).

TABLE 4

| Property | 1-A | 2-A | 3-A | 1-B | 2-B | 3-B |
| --- | --- | --- | --- | --- | --- | --- |
| % coupling[1] | 0.00 | 72.39 | 102.95 | 0.00 | 5.27 | 85.83 |
| Tg (° C.)[1] | −36.72 | −34.65 | −34.22 | −36.72 | −34.65 | −34.22 |
| ML$_{1+4}$ at 100° C.[1] | 1.00 | 1.53 | 9.25 | 1.00 | 1.53 | 9.25 |
| Indexed ML$_{1+4}$ at 130° C.[2] | 1.00 | 1.31 | 1.89 | 1.00 | 1.25 | 3.42 |
| Indexed tan δ at 50° C.[2] | 1.00 | 0.83 | 0.60 | 1.00 | 0.84 | 0.62 |
| Indexed bound rubber (%)[2] | 1.00 | 1.58 | 2.25 | 1.00 | 2.35 | 9.72 |

[1]Refers to measurement on polymer
[2]Refers to measurement made on rubber composition As can be seen from the data of Table 4, the use of the polymer of Example 3 (i.e., a coupled polymer product according to the present disclosure) in rubber compositions leads to lower tan δ at 50° C. indicating that the use of those rubber compositions in tire treads would result in a tire with lower rolling resistance than use of either of the control rubber compositions. Moreover, the use of the polymer of Example 3 (i.e., a coupled polymer product according to the present disclosure) in rubber compositions leads to increased bound rubber values (e.g., at least 100% higher than the control polymer of Example 1 as in Table 4), indicating better rubber-filler interaction than in the control rubber compositions.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A process for preparing a coupled polymer product comprising:
   a. polymerizing at least one conjugated diene monomer and optionally at least one vinyl aromatic monomer using an anionic initiator to produce polymer chains with a living end;
   b. reacting the living end polymer chains from (a) with a vinyl group-functionalized aminosilane compound having formula I:

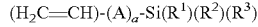

wherein a is an integer of 0 or 1,
   A is divalent and selected from $C_6$-$C_{20}$ aromatic hydrocarbons optionally substituted with alkylene to which the Si is bonded,
   each of $R^1$, $R^2$, and $R^3$ are independently selected from linear or branched $C_1$-$C_{12}$ hydrocarbyl and —N($R^4$)($R^5$), with at least one of $R^1$, $R^2$ and $R^3$ selected from —N($R^4$)($R^5$),
   wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring,
   and $R^1$ and $R^2$ are optionally bonded together into a ring comprising two nitrogen atoms,
   thereby producing a first intermediary product including polymer chains containing at least one vinyl group-functionalized aminosilane compound bonded to the polymer chain via its vinyl group;
   c. continuing polymerization of the at least one conjugated diene monomer and at least one vinyl aromatic monomer when present from (a) upon the polymer chains of the first intermediary product from (b), thereby producing a second intermediary product including polymer chains containing at least one vinyl group-functionalized aminosilane compound of formula I bonded within the polymer chain via its vinyl group, wherein the average number of vinyl group-functionalized aminosilane compound of formula I per polymer chain is about 0.1:1 to about 3:1; and d. reacting the second intermediary product from (c) with a functionalizing compound having formula II

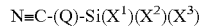

wherein Q is divalent and selected from $C_1$-$C_{12}$ aliphatic divalent hydrocarbon and $C_6$-$C_{18}$ aromatic hydrocarbon, each X is independently selected from halogens and optionally one X is selected from $C_1$-$C_{12}$ aliphatic hydrocarbyl and $C_6$-$C_{18}$ aromatic hydrocarbon,
   thereby producing a coupled polymer product comprising polymers with up to four polymer chains bonded to each functionalizing compound of formula II,
   wherein about 60 to about 95% by weight of the coupled polymer product comprises coupled polymer with two to four polymer chains bonded to each functionalizing compound of formula II.

2. The process of claim 1, wherein the polymerization of (a) is allowed to proceed to 1 to 99% completion prior to (b).

3. The process of claim 1, wherein the molar ratio of the vinyl group-functionalized aminosilane of formula I to anionic initiator is 0.1:1 to 3:1.

4. The process of claim 1, wherein the vinyl group-functionalized aminosilane of formula I has a as 0.

5. The process of claim 1, wherein the vinyl group-functionalized aminosilane of formula I has a as 1.

6. The process of claim 1, wherein the molar ratio of the functionalizing compound of formula II to anionic initiator is 0.05:1 to 1:1.

7. The process of claim 1, wherein 70-95% by weight of the polymer product of (d) is coupled polymer with two to four polymer chains bonded to each functionalizing compound.

8. The process of claim 1, wherein the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 3-methyl-1,3-pentadiene, 4-methyl-1,3-pentadiene, 2,4-hexadiene, and combinations thereof.

9. The process of claim 1, wherein the at least one aromatic vinyl monomer is present in (a) and (c) and is selected from the group consisting of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol.

10. The process of claim 1, wherein at least one of the following is met:
    a. the polymer chains of the coupled polymer product have Mn of 80,000 to 200,000 grams/mole;
    b. the polymer chains of the coupled polymer product have Mw of 80,000 to 400,000 grams/mole; or
    c. the coupled polymer product of (d) has Mw/Mn of 1 to 3.5;
    d. the coupled polymer product of (d) has Mn of 80,000 to 1,000,000 grams/mole; or
    e. the coupled polymer product of (d) has Mw of 80,000 to 1,000,000 grams/mole.

11. A coupled polymer product produced according to the process of any one of claim 1.

12. A coupled polymer product comprising polymer with up to four polymer chains bonded to a functionalizing compound of formula II:

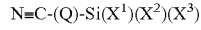

wherein Q is divalent and selected from $C_1$-$C_{12}$ aliphatic divalent hydrocarbon and $C_6$-$C_{18}$ aromatic hydrocarbon, each X is independently selected from halogens and optionally one X is selected from $C_1$-$C_{12}$ aliphatic hydrocarbyl and $C_6$-$C_{18}$ aromatic hydrocarbon, the polymer chains comprising (a) at least one conjugated diene-containing monomer optionally in combination with at least one vinyl aromatic monomer, and (b) at least one vinyl group-functionalized silane compound of formula I bonded within the polymer chain via its vinyl group wherein formula I is as follows:

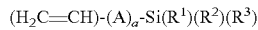

$(H_2C=CH)$-$(A)_a$-$Si(R^1)(R^2)(R^3)$ wherein a is an integer of 0 or 1,

A is divalent and selected from $C_6$-$C_{20}$ aromatic hydrocarbons optionally substituted with alkylene to which the Si is bonded, each of $R^1$, $R^2$, and $R^3$ are independently selected from linear or branched $C_1$-$C_{12}$ hydrocarbyl and —$N(R^4)(R^5)$, with at least one of $R^1$, $R^2$ and $R^3$ selected from —$N(R^4)(R^5)$, wherein each $R^4$ and $R^5$ are independently selected from aliphatic hydrocarbyl of $C_1$-$C_{12}$ or aromatic hydrocarbyl of $C_6$-$C_{18}$, with $R^4$ and $R^5$ optionally bonded together into a ring, and with $R^1$ and $R^2$ optionally bonded together into a ring comprising two nitrogen atoms, wherein the average number of vinyl group-functionalized aminosilane compound of formula I per polymer chain is about 0.1:1 to about 3:1, and about 60 to about 95% by weight of the coupled polymer product has 2 to 4 polymer chains bonded to each functionalizing compound of formula II.

13. The coupled polymer product of claim 12, wherein the vinyl group-functionalized aminosilane of formula I has a as 0.

14. The coupled polymer product of claim 12, wherein the vinyl group-functionalized aminosilane of formula I has a as 1.

15. The coupled polymer product of claim 12, wherein 70% to 95% weight of the coupled polymer product has two to four polymer chains bonded to each functionalizing compound of formula (II).

16. The coupled polymer product of claim 12, wherein the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 3-methyl-1,3-pentadiene, 4-methyl-1,3-pentadiene, 2,4-hexadiene, and combinations thereof.

17. The coupled polymer product of claim 12, wherein the at least one aromatic vinyl monomer is selected from the group consisting of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol.

18. The coupled polymer product of claim 12, wherein at least one of the following is met:
a. the polymer chains of the coupled polymer product have Mn of 80,000 to 200,000 grams/mole;
b. the polymer chains of the coupled polymer product have Mw of 80,000 to 400,000 grams/mole; or
c. the coupled polymer product has Mw/Mn of 1 to 3.5;
d. the coupled polymer product has Mn of 80,000 to 800,000 grams/mole; or
e. the coupled polymer product has Mw of 80,000 to 1,000,000 grams/mole.

19. A tire tread rubber composition comprising:
a. 10-100 parts of the coupled polymer product of claim 2;
b. 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and
c. 5-200 phr of at least one reinforcing filler selected from carbon black, silica, and combinations thereof.

20. A tire comprising a tread comprising the tire tread rubber composition of claim 19.

* * * * *